United States Patent
Inagaki

(10) Patent No.: US 7,267,021 B2
(45) Date of Patent: Sep. 11, 2007

(54) STARTER HAVING REAR END COVER

(75) Inventor: Takahisa Inagaki, Nishio (JP)

(73) Assignee: Denso Corporation, Kariya (JP)

( * ) Notice: Subject to any disclaimer, the term of this patent is extended or adjusted under 35 U.S.C. 154(b) by 749 days.

(21) Appl. No.: 10/822,822

(22) Filed: Apr. 13, 2004

(65) Prior Publication Data

US 2004/0237677 A1    Dec. 2, 2004

(30) Foreign Application Priority Data

May 16, 2003    (JP) ............................... 2003-138642

(51) Int. Cl.
*F02N 11/00*    (2006.01)
(52) U.S. Cl. .................... 74/6; 74/7 A; 74/608; 310/89
(58) Field of Classification Search .................... 74/6, 74/7 A, 608; 310/85, 89
See application file for complete search history.

(56) References Cited

U.S. PATENT DOCUMENTS

| | | | | |
|---|---|---|---|---|
| 3,272,461 A | * | 9/1966 | Larkin ........................ | 248/27.3 |
| 3,562,405 A | * | 2/1971 | Ashford et al. ............. | 174/651 |
| 4,245,870 A | * | 1/1981 | Punshon et al. ............ | 384/247 |
| 5,357,161 A | * | 10/1994 | Daniels ...................... | 310/89 |
| 6,093,988 A | * | 7/2000 | Okawa et al. ............... | 310/85 |
| 6,570,283 B2 | * | 5/2003 | Niimi et al. ................. | 310/85 |
| 6,698,933 B2 | * | 3/2004 | Lau ............................. | 384/420 |

FOREIGN PATENT DOCUMENTS

| | | | |
|---|---|---|---|
| EP | 0 561 587 | * | 9/1993 |
| GB | 2 032 194 | * | 4/1980 |
| JP | 62-230335 | * | 10/1987 |
| JP | A 2002-276515 | | 9/2002 |
| JP | A 2003-184711 | | 7/2003 |

* cited by examiner

*Primary Examiner*—William C. Joyce
(74) *Attorney, Agent, or Firm*—Oliff & Berridge PLC

(57) ABSTRACT

A starter for cranking an internal combustion engine includes an electric motor for driving a pinion gear of the starter. The rear end of the electric motor is covered with a rear end frame having a bearing holder formed thereon. To protect the bearing holder from external force applied to the rear end frame, a rear end cover having an upper plate is connected to the rear end frame. The upper plate of the rear end cover is positioned to form a certain space between the rear end frame and the upper plate. The rear end cover may be connected to the rear end frame by utilizing bolt heads of a pair of through-bolts fastening the electric motor to a front housing and the rear end frame.

12 Claims, 6 Drawing Sheets

FRONT SIDE ⟵⟶ REAR SIDE

STARTER HAVING REAR END COVER

CROSS-REFERENCE TO RELATED APPLICATION

This application is based upon and claims benefit of priority of Japanese Patent Application No. 2003-138642 filed on May 16, 2003, the content of which is incorporated herein by reference.

BACKGROUND OF THE INVENTION

1. Field of the Invention

The present invention relates to a starter for cranking an internal combustion engine.

2. Description of Related Art

An example of a starter for cranking an internal combustion engine is shown in JP-A-2002-276515. Relevant portions of this starter are briefly shown in FIGS. 5 and 6 attached hereto. The starter has two axes parallel to each other: one is an axis of an electric motor 100 having a pinion gear connected to its front end; and the other is an axis of a magnetic switch 110 for supplying electric power to the electric motor in an ON-OFF fashion and for driving the pinion gear toward a ring gear of the engine.

A yoke 120 of the electric motor 100 is sandwiched between a front housing 130 and a rear end frame 140, and the front housing 130 and the rear end frame 140 are connected to each other with a pair of through-bolts 150. The rear end frame 140 has a cylindrical bearing holder 141 at its center, and a rear end of an armature shaft 170 is supported by a bearing 160 held in the bearing holder 141. In this structure of the starter, there is a possibility that the bearing holder 141 be deformed when a large force is applied to the rear end frame 140 from the rear side thereof. If the bearing holder 141 is deformed, the armature shaft 170 will be prevented from smooth rotation.

SUMMARY OF THE INVENTION

The present invention has been made in view of the above-mentioned problem, and an object of the present invention is to provide an improved starter having a rear end cover for protecting a rear end frame from an external force applied thereto.

The starter for cranking an internal combustion engine is composed of an electric motor, a front housing, a rear end frame, a magnetic switch connected to the front housing integrally with the electric motor, a pinion gear adapted to be driven by the electric motor, and other associated components. The front side of the electric motor is covered with the front housing, and the rear end of the electric motor is covered with a rear end frame. The front housing, the electric motor and the rear end frame are connected together by a pair of through-bolts. An armature of the electric motor is rotatably supported by a front bearing held in the front housing and a rear bearing held in the rear end frame.

The rear bearing is disposed in a bearing holder formed on a rear surface of the rear end frame. To protect the bearing holder from external force applied to the rear end frame, a rear end cover is connected to the rear end frame. The rear end cover is composed of an upper plate, a pair of sidewalls bent from the upper plate, a pair of lower plates bent from the sidewalls, and a pair of arms extending from the pair of lower plates. Each arm of the rear end cover is connected to a male-threaded portion extending from the through-bolt by fastening a nut to the male-threaded portion. Thus, the upper plate is positioned in parallel to the rear surface of the rear end frame, forming a certain space therebetween, and the lower plates are also positioned in parallel to the rear surface, forming a small gap therebetween.

The pair of arms of the rear end cover may be fastened to the rear end frame together with the through-bolts. It is preferable to mount the rear end cover on the rear end frame so that the most portions of the rear end cover are located within an outer periphery of the rear end frame in order to avoid interference with other parts to be mounted on the engine. A battery cable led from an on-board battery to a terminal bolt of the magnetic switch may be disposed in the space between the upper plate of the rear end cover and the rear surface of the rear end frame.

According to the present invention, the rear surface of the rear end frame, especially the bearing holder, is properly protected from external force applied to the rear end frame. In addition, the rear end cover can be easily connected to the rear end cover after a manufacturing process of the starter is completed. Other objects and features of the present invention will become more readily apparent from a better understanding of the preferred embodiment described below with reference to the following drawings.

DETAILED DESCRIPTION OF THE PREFERRED EMBODIMENT

Figure 1:
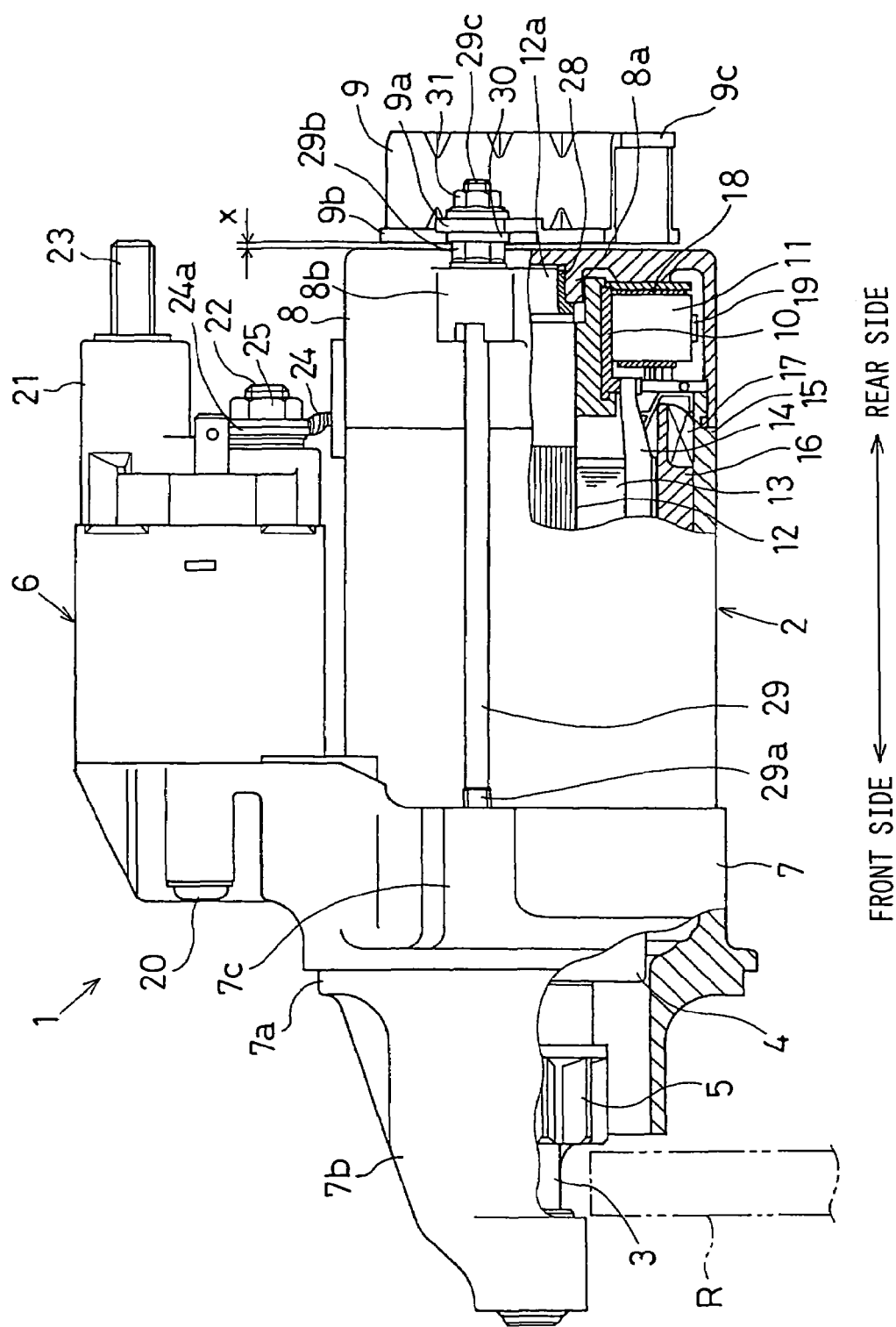
FIG. 1 is a side view (partially cross-sectioned) showing a starter according to the present invention.

A preferred embodiment of the present invention will be described with reference to FIGS. 1-4. As shown in FIG. 1, a starter 1 is composed of: and electric motor 2; an output shaft 3 driven by the electric motor 2; a one-way clutch 4 and pinion gear 5 slidably coupled to the output shaft 3; a magnetic switch 6 for supplying electric current to the electric motor 2 in an ON-OFF fashion; a front housing 7 covering the front end of the starter; a rear end frame 8 covering the rear end of the electric motor 2; a rear end cover 9 covering the rear end frame 8; and other associated components.

The electric motor 2 is a known type of a direct current motor having an armature rotating in a magnetic field formed in a stator. The armature is composed of an armature shaft 12, an armature core 13 fixed to the armature shaft 12, an armature coil 14 wound on the armature core 13, and a commutator 10 to which electric current is supplied from brushes 11 slidably contacting the commutator 10. The commutator 10 composed of plural commutator segments circularly arranged is fixedly connected to an rear end portion of the armature shaft 12. The commutator segments are electrically and mechanically connected to the armature coil 14. Upon closing a starter switch (not shown), motor contacts in the magnetic switch 6 are closed to thereby supply electric current to the armature from an on-board battery (not shown).

A yoke 15 is sandwiched between the front housing 7 and the rear end frame 8. Poles 16 around which field coils 17 are wound are disposed inside the yoke 15. Permanent magnets may be used in place of the field coils 17. Brushes 11 are held in brush holders 18 which are connected to the rear end frame 8. The brushes 11 are pushed against the outer periphery of the commutator 10 by the brush springs 19.

The armature shaft 12 is connected to the output shaft 3, e.g., via a planetary gear speed reduction mechanism so that a rotational torque of the armature shaft 12 is transferred to the output shaft 3 after its speed is reduced. The armature shaft 12 may be extended to form the output shaft 3 without using the speed reduction mechanism. The one-way clutch 4 is composed of an inner ring coupled to the output shaft 3 by means of a helical spline, an outer ring connected to the speed reduction mechanism and rollers disposed between the inner ring and the outer ring. The rotational torque of the outer ring is transferred to the inner ring via the rollers, but the rotational torque is not transferred from the inner ring to the outer ring.

The pinion gear 5 is integrally formed with the inner ring of the one-way clutch. The pinion gear 5 is pushed forward together with the one-way clutch 4 toward the ring gear R, sliding on the output shaft 3, and engages with the ring gear R for cranking the engine. The magnet switch 6 is connected to the front housing 7 with screws 20, as shown in FIG. 1. Upon closing the starter switch, a coil (not shown) disposed in the magnet switch 6 is energized, and a plunger (not shown) disposed in the coil is driven to close the motor contacts. At the same time, the plunger drives the pinion gear 5 together with the one-way clutch 4 toward the ring gear R.

The motor contacts are composed of a stationary contact mechanically and electrically connected to a motor terminal bolt 22 and another stationary contact mechanically and electrically connected to a battery terminal bolt 23. Both terminal bolts 22, 23 are firmly held by a cover 21 made of resin. A lead wire terminal 24a connected to a lead wire 24 which is in turn connected to a plus side brush 11 is fastened to the motor terminal bolt 22 by a nut 25. A battery cable terminal 26a connected to a battery cable 26 is fastened to the battery terminal bolt 23 by a nut 27 (refer to FIG. 4).

The front housing 7 has a nose portion 7b covering an upper half of the pinion gear 5 and a circular portion 7a to be connected to an engine block. The front end of the output shaft 3 is rotatably supported by a bearing disposed at the front end of the nose portion 7b. A lower half of the nose portion 7b is open to form a space for the pinion gear 5 to engage with the ring gear R.

The rear end frame 8 is connected to the outer periphery of the rear end of the yoke 15. The rear end frame 8 has a bearing holder 8a to which a bearing 28 is press-fitted. The rear end 12a of the armature shaft 12 is rotatably supported by the bearing 28. The yoke 15 is sandwiched between the front housing 7 and the rear end frame 8, and the front housing 7 and the rear end frame 8 are firmly connected to each other by a pair of through-bolts 29. A pair of threaded holes 7c are formed in the front housing 7, and a pair of bolt-head-supporting portions 8b are formed on the rear end frame 8. The pair of through-bolts 29 are screwed to the threaded holes 7c while supporting their bolt heads 29b on the bolt-head-supporting portions 8b. Each through-bolt 29 has a male-threaded portion 29c extending to the rear side from the bolt head 29b.

Figure 3A:
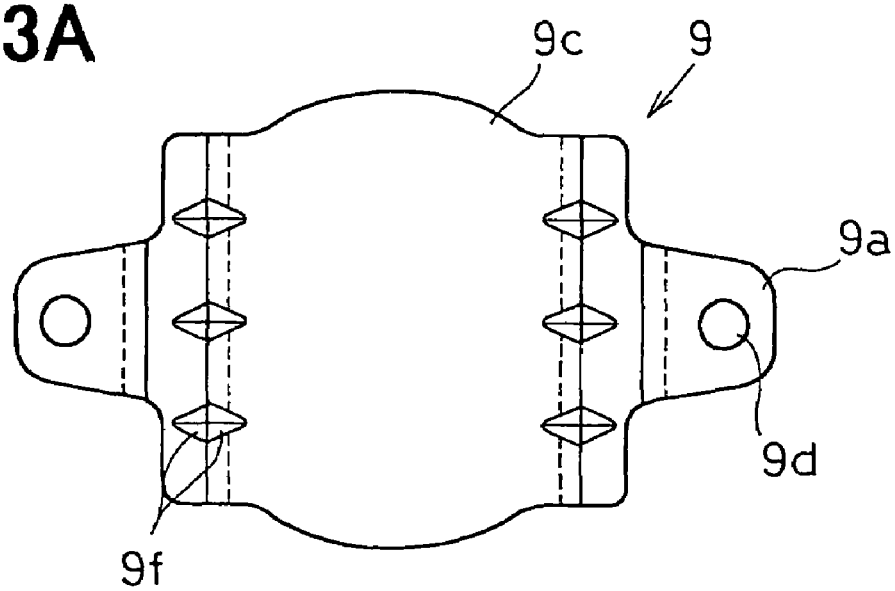
FIG. 3A is a plan view showing a rear end cover for covering the rear end frame of the starter.
Figure 3B:
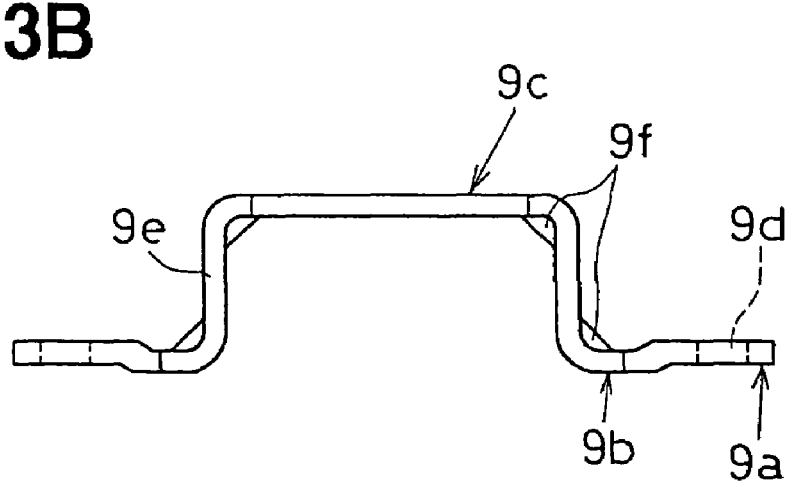
FIG. 3B is a side view showing the rear end cover shown in FIG. 3A.

The rear end cover 9 covering the rear surface of the rear end frame 8 is shown in FIGS. 3A and 3B. The rear end cover 9 is formed by presswork from a single piece of metallic plate such as a steel plate. As better seen in FIG. 3B, the rear end cover 9 has an upper plate 9c, a pair of sidewalls 9e bent from the upper plate 9c at a right angle, a pair of lower plates 9b bent from the respective sidewalls 9e at a right angle, and a pair of arms 9a extending to both sides. The upper plate 9c and the pair of lower plates 9b are positioned in parallel to each other, and a small difference in the height direction of the rear end cover 9 is made between the lower plates 9b and the arms 9a. Both sides of the upper plate 9c are curved to form curved arcs swelling outside, as shown in FIG. 3A. Reinforcing ribs 9f are formed at a bent portion between the upper plate 9c and the sidewall 9e as shown in FIGS. 3A and 3B. Similarly, reinforcing ribs 9f are also formed at a bent portion between the sidewall 9e and the lower plate 9b.

Figure 2:
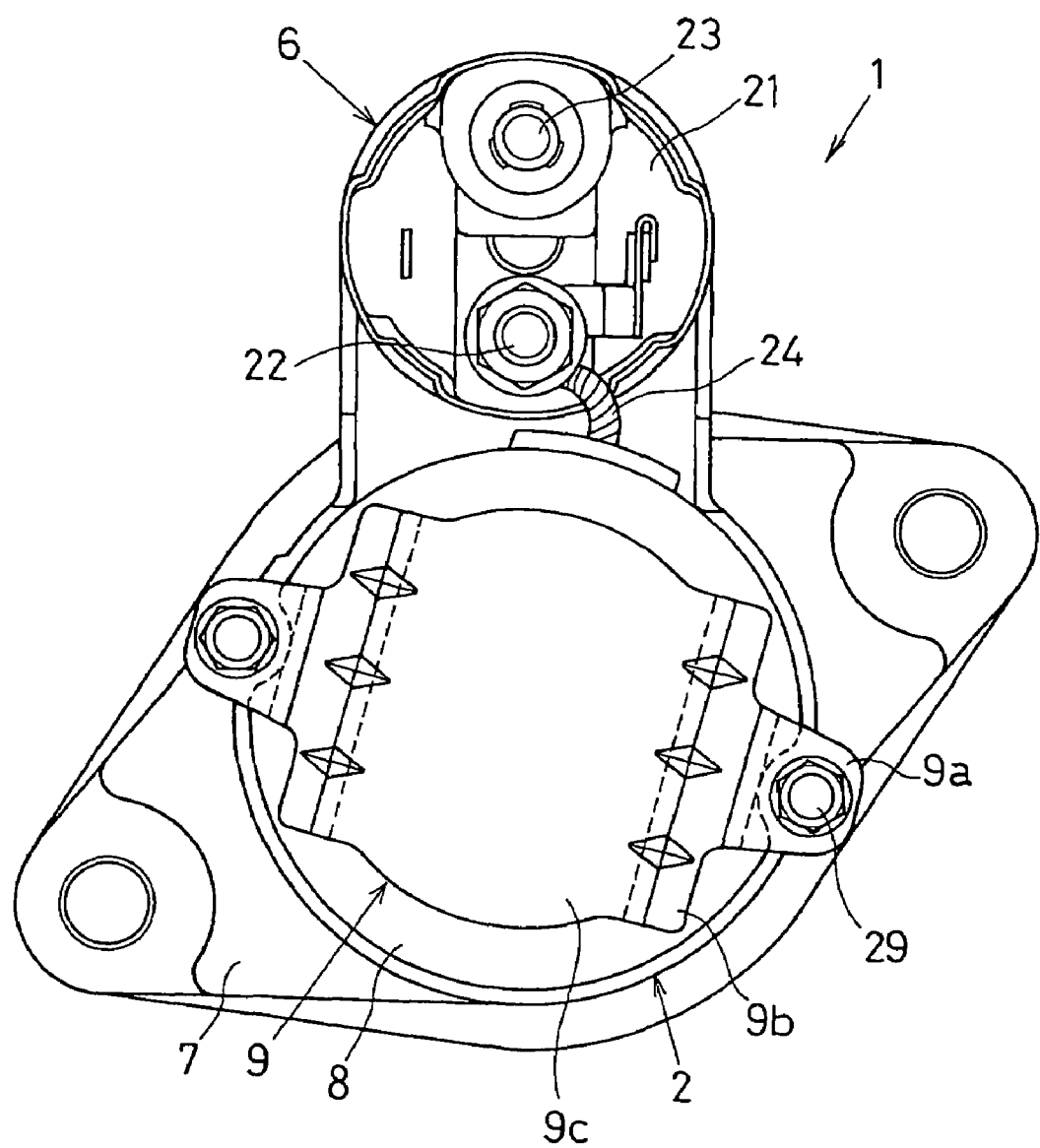
FIG. 2 is a plan view showing the rear end of the starter, viewed from the rear side of the starter.

As shown in FIG. 1, the rear end cover 9 is connected to the rear end frame 8 by inserting the male-threaded portion 29c into a round hole 9d of the arm 9a and then fastening a nut 31 to the male-threaded portion 29c. The rear end cover 9 is fixed to the rear end frame 8 using the male-threaded portions 29c of the pair of through-bolts 29. As means for fixing the rear end cover 9 on the through-bolts 29, any type of screws, welding, staking or press-fitting may be used. A washer 30 having a plane surface, which is larger than that of the bolt head 29b, is interposed between the bolt head 29b and the arm 9a, as shown in FIG. 1. The rear end frame 8, at least the portion where the bearing holder 8a is formed, is covered with the upper plate 9c of the rear end cover 9. The pair of lower plates 9b are positioned to face the rear end surface of the rear end frame 8, forming a small gap "x" therebetween. As shown in FIG. 2, the rear end cover 9 is connected to the rear end frame 8, so that at least the upper plate 9c and the pair of lower plates 9b are encompassed within an outer periphery of the rear end frame 8.

Now, operation of the starter described above will be explained. Upon closing the starter switch, the coil in the magnetic switch 6 is energized, and the plunger in the coil is driven to the rear side of the starter 1. The movement of the plunger is transferred to a shift lever (not shown) which drives the one-way clutch 4 together with the pinion gear 5 to the front side. Thus, the pinion gear 5 sildably shifts on the output shaft 3 toward the ring gear R and stops when the front end of the pinion gear 5 abuts with the ring gear R.

On the other hand, the motor contacts in the magnetic switch 6 are closed in response to the movement of the plunger. Current from the on-board battery is supplied to the armature of the electric motor 2 through the battery terminal bolt 23 connected to the on-board battery and the motor terminal bolt 22. Thus, the armature is rotated. The rotation of the armature is transferred to the pinion gear 5 via the one-way clutch 4, and thereby the pinion gear 5 is further pushed forward to a position where the pinion gear 5 engages with the ring gear R. The engine is cranked up by being rotated by the starter 1 via its ring gear R.

After the engine is cranked up, the starter switch is turned off. The coil in the magnetic switch 6 is de-energized, and the plunger returns to its initial position by a biasing force of a spring. The motor contacts are opened and current supply to the armature is terminated. At the same time, the shift lever returns to its initial position to thereby shift the pinion gear 5 to the rear side. Thus, the pinion gear 5 disengages with the ring gear R and returns to its initial position shown in FIG. 1.

Advantages attained in the starter 1 having the rear end cover 9 will be summarized below. A force applied to the rear end frame 8 on its rear end surface is received by the rear end cover 9, especially by its upper plate 9*c*. Therefore, the force from the rear side is not directly applied to the rear surface of the rear end frame 8, and the bearing holder 8*a* is protected from being deformed or damaged by the outside force.

Since the lower plates 9*b* face the rear end surface of the rear end frame 8 with the small gap "x" interposed therebetween, the lower plates 9*b* do not contact the rear end surface of the rear end frame 8 unless an excessively large force is imposed on the rear end cover 9. If an excessively large force is imposed on the rear end cover 9, the lower plates 9*b* will deform relative to the arms 9*a* which are supported on the heads 29*b* of the through-bolts 29. As a result, the lower plates 9*b* contact the rear surface of the rear end frame 8, and the excessively large force is received by both of the rear surface and the bolt-head-supporting portions 8*b* of the rear end frame 8. Therefore, the bearing holder 8*a* can be protected from a large external force.

Further, since a plane area of the upper plate 9*c* for receiving an external force is enlarged by swelling both sides thereof, an almost entire rear surface of the rear end frame 8 is protected by the rear end cover 9. Since the upper plate 9*c* and the lower plates 9*b* are positioned within the outer periphery of the rear end frame 8, they do not interfere with other parts or components mounted on the vehicle near the starter 1. Since the rear end cover 9 is connected to the male-threaded portions 29*c* of the through-bolts 29, the rear end cover 9 is easily attached to the rear end frame 8 even after the starter 1 is completely assembled. Accordingly, it is not necessary to change the assembling process for additionally connecting the rear end cover 9.

Further, since the rear end cover 9 is made from a single metallic plate by presswork, the rear end cover is suitable to mass-production. Since the washer 30 having its surface larger than the surface of the bolt-head 29*b* is interposed between the bolt-head 29*b* and the lower plate 9*b*, a larger external force can be received by the washer 30. Since the rear end cover 9 is reinforced by the plural ribs 9*f* formed at bent portions, an entire mechanical strength of the rear end cover 9 is improved.

The upper plate 9*c* of the rear end cover 9 is positioned at a further rear side of the battery terminal bolt 23, as shown in FIG. 1. Therefore, a possibility that the battery terminal bolt 23 is hit by other parts or components from the rear side can be reduced, and the battery terminal bolt 23 is protected from possible damages.

Figure 4:
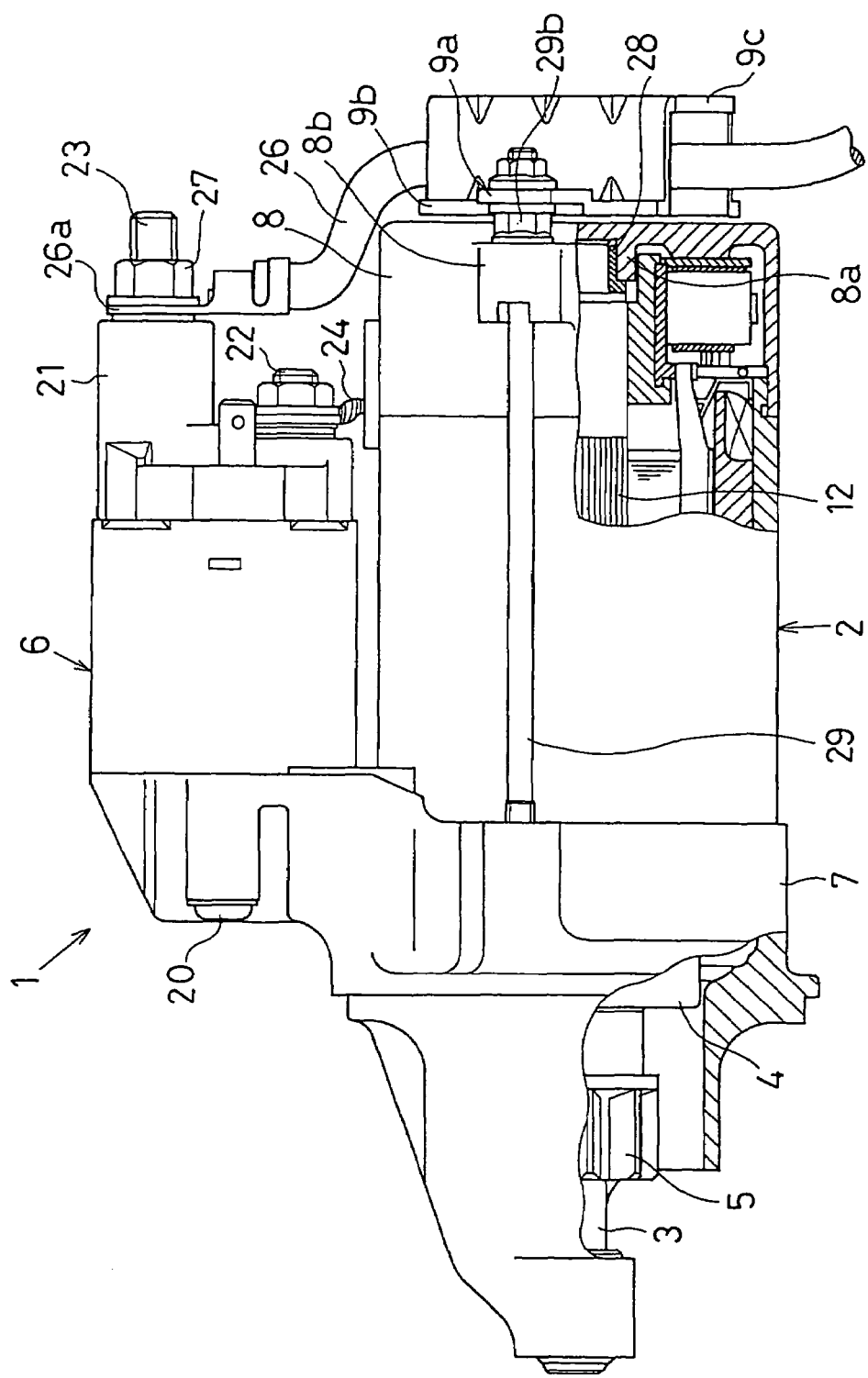
FIG. 4 is a side view (partially cross-sectioned) showing a starter according to the present invention, the starter including a battery cable led to a battery terminal bolt through a rear end cover.
Figure 5:
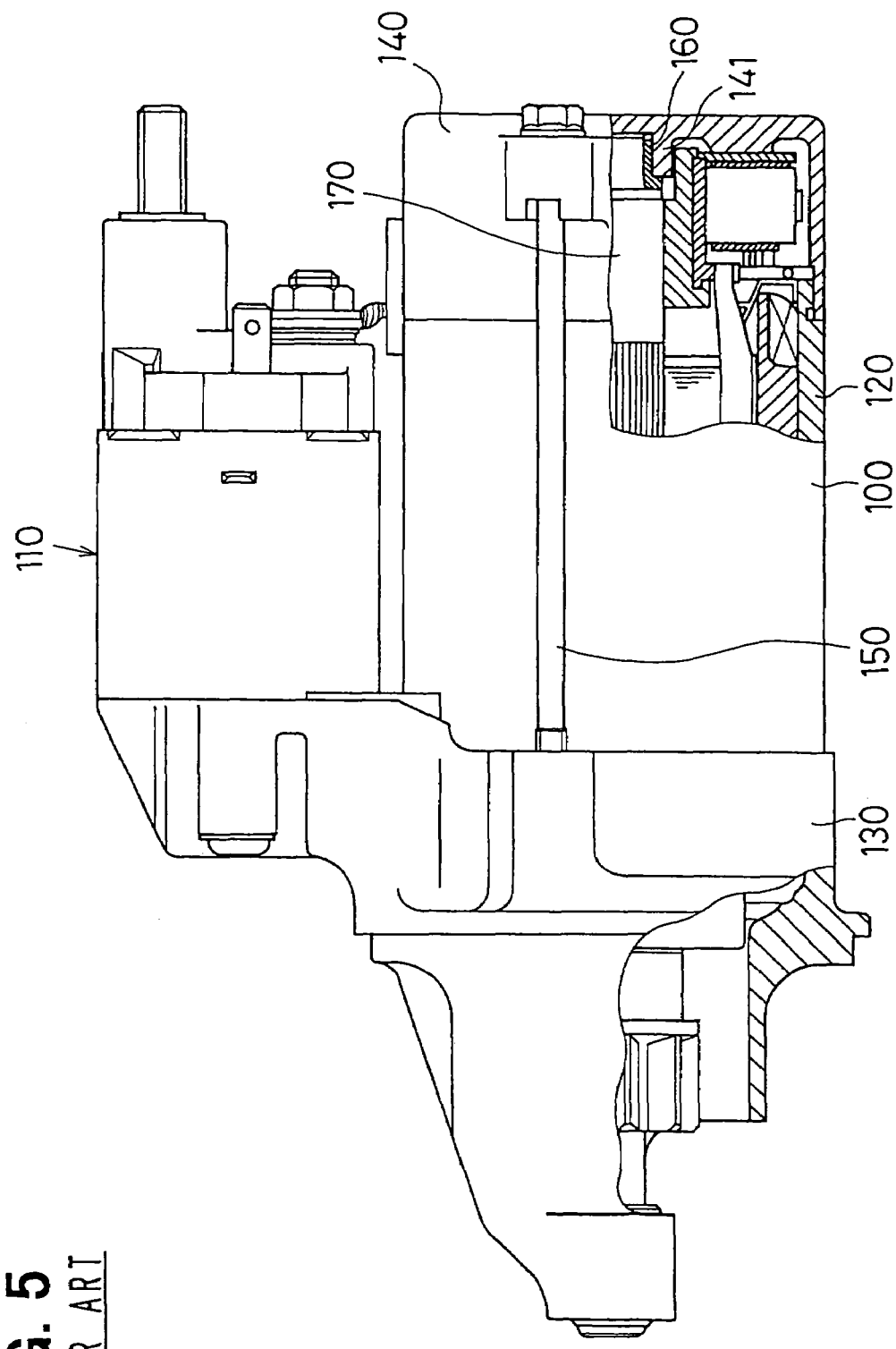
FIG. 5 is a side view (partially cross-sectioned) showing a conventional starter.
Figure 6:
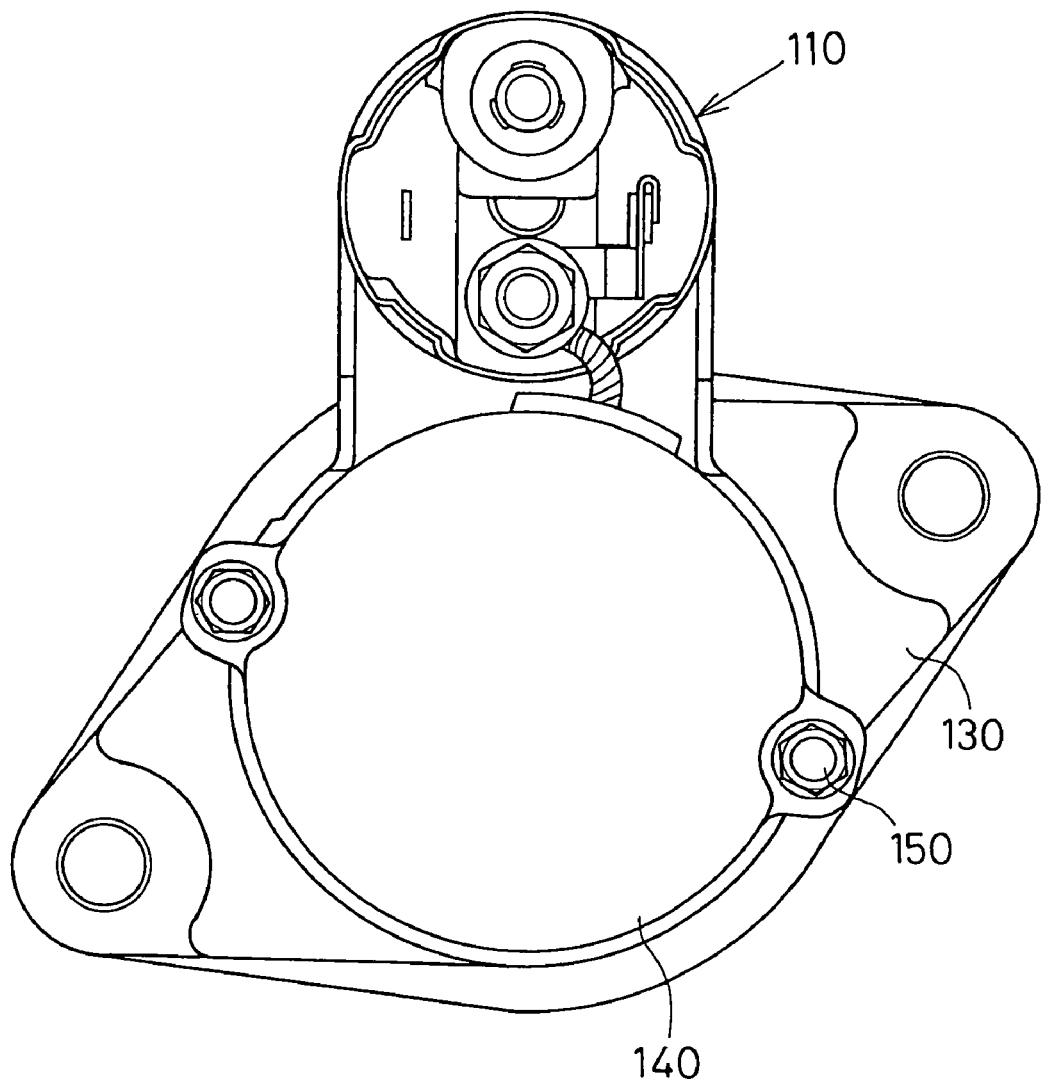
FIG. 6 is a plan view showing a rear end of the starter shown in FIG. 5.

The present invention is not limited to the embodiment described above, but it may be variously modified. For example, as shown in FIG. 4, the battery cable 26 may be led to the battery terminal bolt 23 through a space between the rear end frame 8 and the rear end cover 9. A battery cable terminal 26*a* is connected to the battery terminal bolt 23 by fastening a nut 27 thereto. Wires other than the battery cable 26 may be led through the same space between the rear end frame 8 and the rear end cover 9, and a proper clamp may be provided on the rear end cover 9 for clamping those wires.

Though the washer 30 is used for connecting the rear end cover 9 to the head 29*b* of the through-bolt 29 in the foregoing embodiment, it is possible to eliminate the washer 30. The arms 9*a* of the rear end cover 9 may be directly connected to the bolt-head supporting portions 8*b* at the same time when the through-bolts 29 are screw-fastened. In this case, the male-threaded portion 29*c* extending from the bolt-head 29*b* is eliminated. The small step in the height direction made between the lower plate 9*b* and the arm 9*a* may be eliminated if the small gap "x" between the end surface of the rear end frame 8 and the lower plate 9*b* is secured by other ways, e.g., by providing a proper thickness of the washer 30 or changing the position of the bolt-head-supporting portion 8*b* in the axial direction. In this case, the lower plate 9*b* and the arm 9*a* are formed at the same level in the height direction.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A starter for cranking an internal combustion engine, the starter comprising:
   a front housing;
   a rear end frame having a rear end surface;
   an electric motor disposed between the front housing and the rear end frame, the front housing and the rear end frame being connected to each other by a pair of through-bolts with the electric motor interposed therebetween; and
   a rear end cover for covering the rear end surface of the rear end frame, the rear end cover comprising: an upper plate; a pair of sidewalls bent from the upper plate; a pair of lower plates, each being bent from each sidewall in parallel to the upper plate; and a pair of arms, each extending from each lower plate, wherein:
   the rear end cover is connected to the rear end frame, so that the upper plate is positioned in parallel to the rear end surface of the rear end frame with a predetermined space formed therebetween, and the pair of lower plates are positioned in parallel to the rear end surface with a small gap formed therebetween.

2. The starter as in claim 1, wherein:
   the rear end frame includes a pair of bolt-head-supporting portions for receiving a fastening force of the through-bolts; and
   the arms of the rear end cover are supported on the bolt-head-supporting portions.

3. The starter as in claim 2, wherein:
   the arms of the rear end cover are fixed on the through-bolts by fixing means.

4. The starter as in claim 2, wherein:
   the through-bolt includes a bolt head that is supported on the bolt-head-supporting portion and a male-threaded portion extending from the bolt head in the axial direction of the through-bolt; and
   the arm of the rear end cover is fastened to the male-threaded portion with a fastening nut.

5. The starter as in claim 4, wherein:
   a washer having a flat surface which is larger than that of the bolt head is interposed between the bolt head and the arm of the rear end cover.

6. The starter as in claim 1, wherein:
   the upper plate of the rear end cover has a surface substantially in a rectangular shape, and both sides of the surface not connected to the sidewalls are curved to form circular arcs swelling outside.

7. The starter as in claim 1, wherein:
at least the upper plate and the pair of lower plates of the rear end cover are disposed to be encompassed within an outer periphery of the rear end frame.

8. The starter as in claim 1, wherein:
reinforcing ribs are formed at a bent portion between the upper plate and the sidewall.

9. The starter as in claim 1, wherein:
reinforcing ribs are formed at a bent portion between the upper plate and the sidewall, and at a bent portion between the sidewall and the lower plate.

10. The starter as in claim 1, wherein:
the rear end cover is formed from a single metallic plate by presswork.

11. The starter as in claim 1, further comprising a magnetic switch for supplying electric current to the electric motor in an ON-OFF fashion, the magnetic switch being connected to the front housing thereby forming a unitary body of the starter, wherein:

the magnetic switch includes a battery terminal bolt, to which a battery cable is connected, extending to the rear side of the starter in the axial direction thereof; and the upper plate of the rear end cover is positioned at a further rear side of the axial end of the battery terminal bolt.

12. The starter as in claim 11, wherein the battery cable is led to the battery terminal bolt through a space between the upper plate and the rear end frame.

* * * * *